United States Patent [19]

Kamimaru

[11] Patent Number: 4,664,077

[45] Date of Patent: May 12, 1987

[54] RECIPROCATING INTERNAL COMBUSTION ENGINE

[75] Inventor: Shinji Kamimaru, Higashikurume, Japan

[73] Assignee: Fuji Jukogyo Kabushiki Kaisha, Tokyo, Japan

[21] Appl. No.: 781,448

[22] Filed: Sep. 27, 1985

[30] Foreign Application Priority Data

Sep. 28, 1984 [JP] Japan ................... 59-205362

[51] Int. Cl.$^4$ .................. F02B 75/04; F02B 75/26
[52] U.S. Cl. .................. 123/54 R; 123/78 A
[58] Field of Search .......... 123/54, 48 R, 48 A, 123/78 R, 78 A

[56] References Cited

U.S. PATENT DOCUMENTS

| | | | |
|---|---|---|---|
| 792,615 | 6/1905 | Ramsey | 123/54 R |
| 1,099,576 | 6/1914 | Slaby | 123/78 A |
| 1,848,597 | 3/1932 | Arnold | 123/78 A |
| 3,312,206 | 4/1967 | Radovic | 123/78 A |
| 4,449,489 | 5/1984 | Williams | 123/48 R |

FOREIGN PATENT DOCUMENTS

| | | | |
|---|---|---|---|
| 98531 | 8/1981 | Japan . | |
| 310321 | 5/1930 | United Kingdom | 123/48 A |

*Primary Examiner*—Craig R. Feinberg
*Attorney, Agent, or Firm*—Martin A. Farber

[57] ABSTRACT

A reciprocating internal combustion engine has a head block axially slidably mounted in a bore formed in a cylinder block in alignment with the cylinder bore, and a cam for moving the head block in the bore in accordance with the position of the piston. The crankshaft of the engine is laterally offset from the axis of the cylinder bore by the length of the crank radius. The cam is so arranged that the motoring pressure becomes maximum at the crank angle of 90 degrees.

6 Claims, 4 Drawing Figures

RECIPROCATING INTERNAL COMBUSTION ENGINE

BACKGROUND OF THE INVENTION

The present invention relates to an apparatus for reducing the pressure of a piston exerted on a cylindrical inside wall of a cylinder of a reciprocating internal combustion engine.

Japanese patent Laid-Open Application No. 56-98531 has disclosed an apparatus in which the axis of a crankshaft is offset from the axis of a cylinder for reducing the pressure of a side of a piston against the inside wall of the cylinder. Explosion pressure exerted on the top of the piston is divided into an axial component and a radial component. The radial component of the explosin pressure acts to push the piston against the inside wall of the cylinder, so that friction between the piston and the cylinder wall increases, resulting in a decrease of the output of the engine. In this prior art, the offset distance is calculated from experimentally to be more than 10% and less than 45% of the piston stroke. However, the problem is that the explosion pressure is not effectively converted to the rotation of the crank shaft because the crank and the connecting rod are aligned with each other at the top dead center.

SUMMARY OF THE INVENTION

Therefore, the object of the present invention is to solve such problems and to provide a reciprocating internal combustion engine which reduces the pressure exerted on the inside wall of a cylinder and increase the power of the engine.

According to the present invention, there is provided a reciprocating internal combustion engine comprising a head block axially slidably mounted in a bore formed in a cylinder block in alignment with a cylinder bore, forming a combustion chamber between the bottom thereof and the top of a piston, and means for moving the head block in the bore in accordance with the position of the piston. The crankshaft of the engine is laterally offset form the axis of the cylinder bore by the length of the crank radius. The means is so arranged that the stroke of the head block between TDC and 90° in crank angle is equal to the piston travel. The intake and exhaust valves of the engine are provided in the head block.

In an aspect of the present invention, the means comprises a cam rotated at half of the speed of the crankshaft, and a spring to urge the head block to the cam.

The other objects and features of this invention will be become understood from the following description with reference to the accompanying drawings.

DETAILED EXPLANATION OF THE INVENTION

Figure 1:
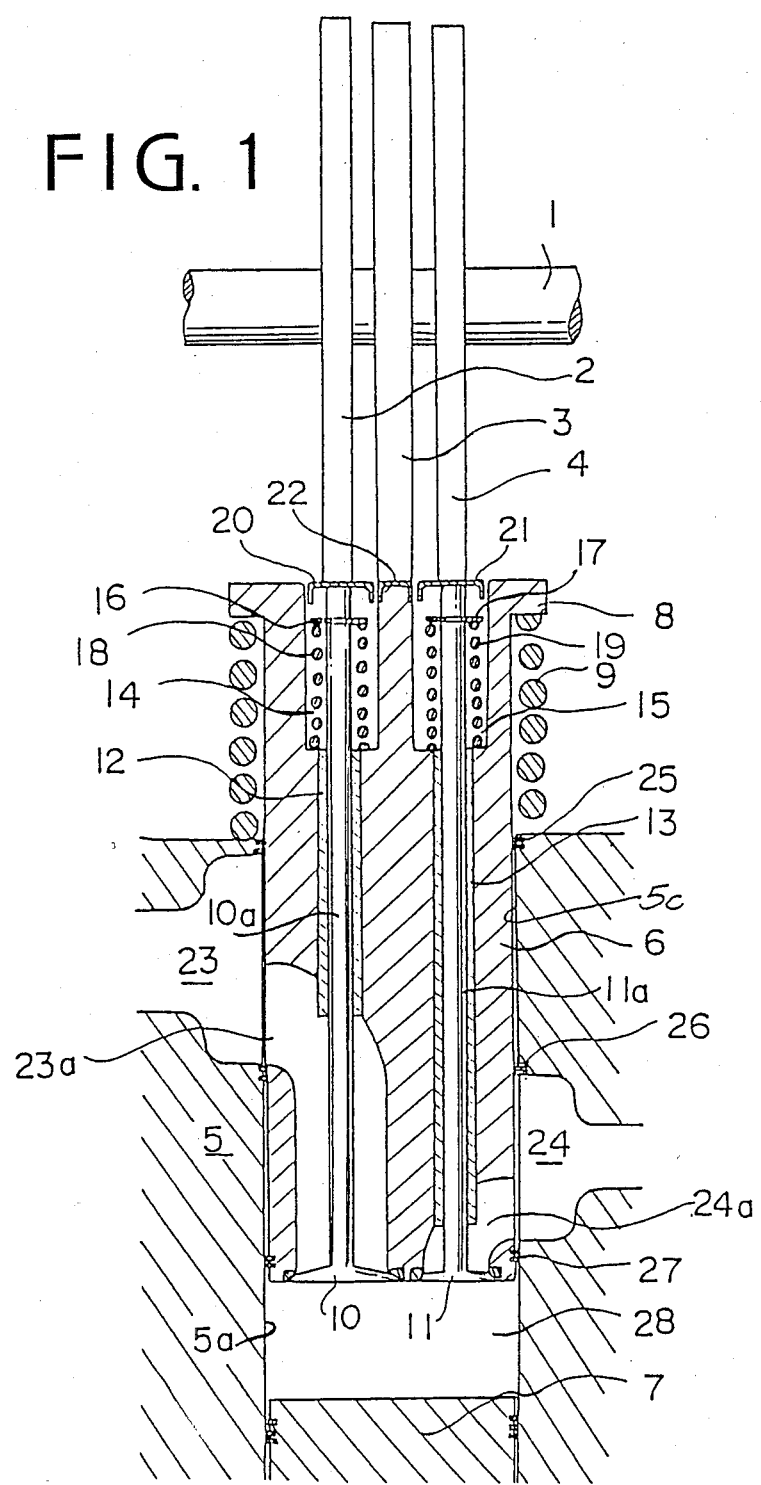
FIG. 1 is a sectional view showing cams and a head of a cylinder of a reciprocating combustion engine of the present invention.

As shown in FIG. 1, a reciprocating internal combustion engine according to the present invention has a camshaft 1 which rotates at half of the speed of a crankshaft. A cam 2 for an intake valve, a cam 3 for lifting a head block 6, and a cam 4 for an exhaust valve are attached to the camshaft 1. A bore 5c is formed in a cylinder block 5 opening into a cylinder bore 5a and opening at the top surface of the cylinder block. The cylindrical head block 6 is slidably mounted in the bore to form a combustion chamber 28. A piston 7 is provided in the combustion chamber as a conventional engine. The head block 6 extends outwardly from the cylinder block 5, and a spring 9 is provided between a flange 8 formed at the upper end of the head block 6 and the outer wall of the cylinder block 5. An intake valve 10 and an exhaust valve 11 having respective valve stems 10a and 11a are actuated by cams 2 and 4 respectively so the stems slide up and down along stem guides 12 and 13, respectively. Cylindrical grooves 14 and 15 formed in a top portion of the head block 6 contain valve springs 18 and 19, respectively, which are retained by retainers 16 and 17, respectively. The load of the head spring 9 is set to be larger than the lifting load of the valve springs 18 and 19, so that the head block 6 is not moved by the force actuating valves 10 and 11. Valve lifters 20 and 21 slidably engaging with cams 2 and 3, respectively, are provided at upper ends of the valve stems 10a and 11a of the intake and exhaust valves 10 and 11. Further, a head lifter 22 slidably engaged with the cam 3 is provided at a center part of the top of the head block 6 for lifting the head block 6.

An intake port 23 is provided in the cylinder block 5. The diameter of the intake port 23 facing the wall of the head block 6 is larger than the diameter of an opening of an intake port 23a formed in the head block 6, so that the intake port 23a does not move further out of the area of the opening 23 when the head block 6 moves up and down. Exhaust ports 24 and 24a are formed in the cylinder block 5 and the head block 6 in the same relation to the intake ports mentioned above. Seal rings 25 and 26 are provided on the wall of the cylinder block 5 and a ring 27 is provided on the wall of the head block 6 to seal the gap between the cylinder block 5 and the head block 6 around the openings of the ports 23 and 24.

Figure 2:
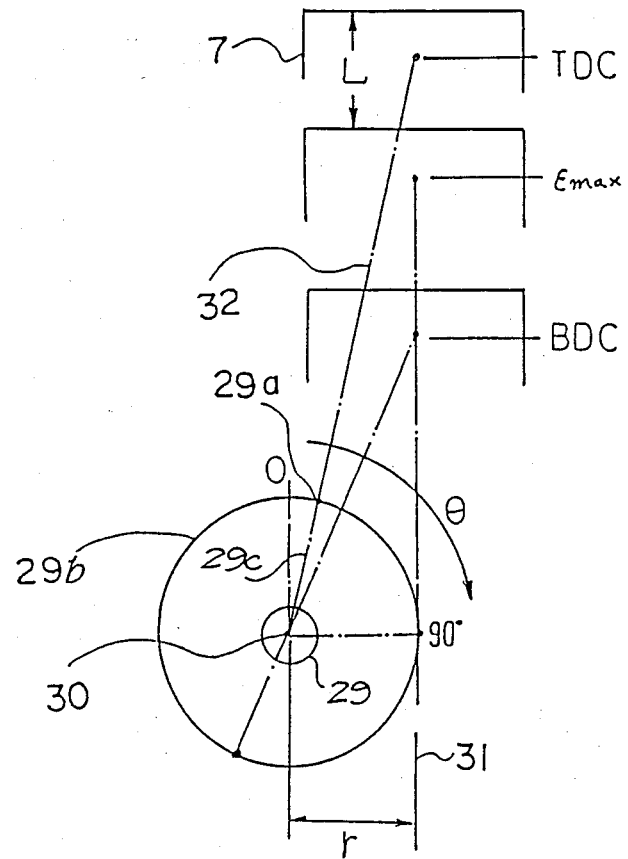
FIG. 2 is a schematic view showing the relationship between a piston and a crankshaft of the reciprocating internal combustion engine of the present invention.

FIG. 2 shows the relation between the crank angle and the position of the piston of the reciprocating internal combustion engine according to the present invention.

In FIG. 2, an axis 30 of a crankshaft 29 is laterally offset from the axis 31 of the cylinder bore 5a by the length of the crank radius (r) so that the axis 31 may become a tangent to the circle 29b of the crank radius. The crankshaft 29 is pivotally engaged with a connecting rod 32 through a crank pin 29a. When the piston 7 reaches the top dead center, the crank arm 29c comes into alignment with the connection rod 32. The contour of the cam 3 is designed to position the head block 6 to produce a maximum motoring pressure in the cylinder 5a, when the crankshaft 29 rotates clockwise (in the direction by the arrow in FIG. 3) 90 degrees.

Figure 3:
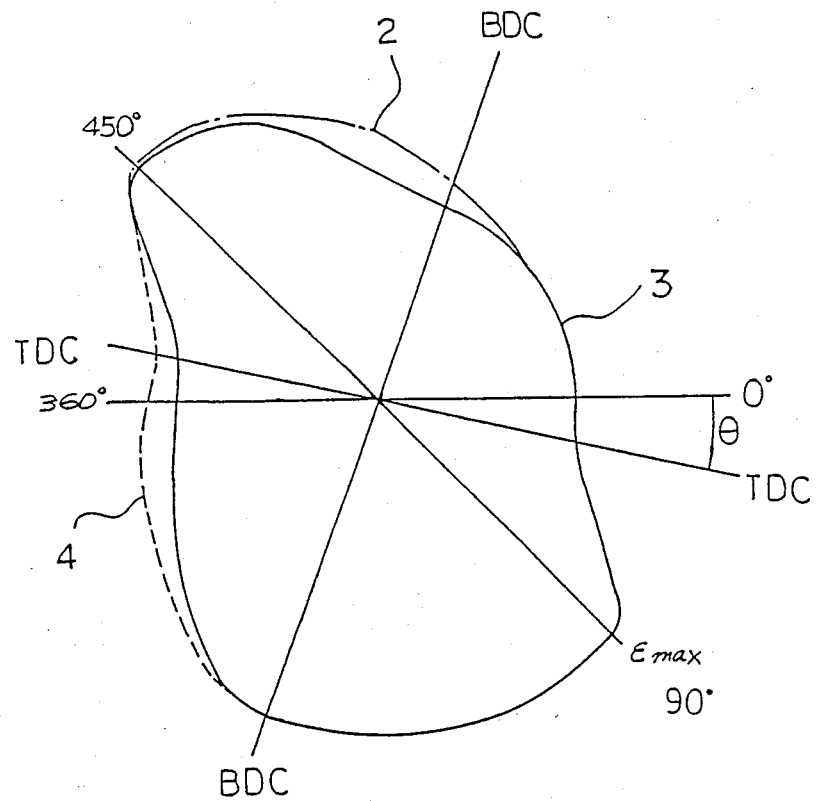
FIG. 3 shows cams employed in the reciprocating internal combustion engine of the present invention.
Figure 4:
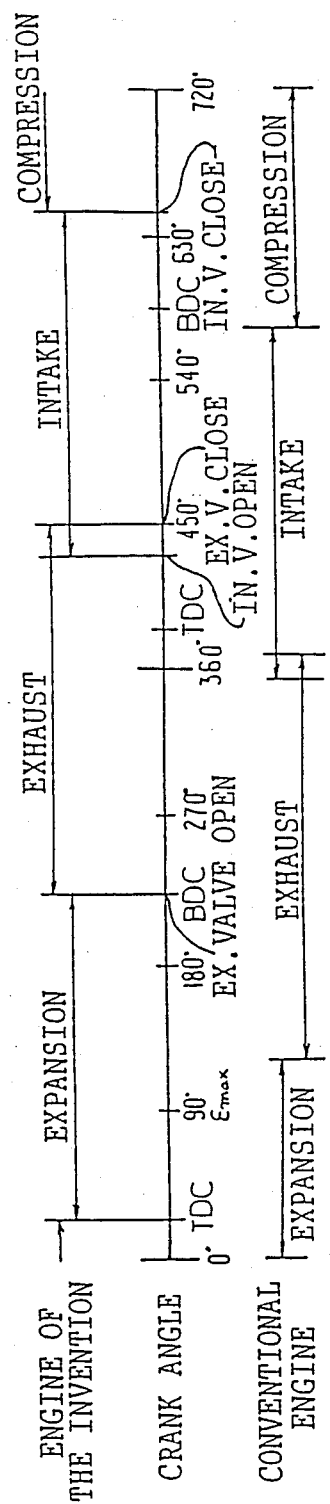
FIG. 4 is a diagram for comparing the cycles of the reciprocating internal combustion engine of the present invention and of the conventional engine, in relation to crank angle $\theta$.

FIG. 3 shows the configurations of cams 2, 3 and 4. The contour of each of the cams 2 and 4 is in accordance with the contour of the cam 3. The head block 6 does not move from the crank angle of 0° to the top dead center (TDC) during the crank angle $\theta$, because the contour of cam 3 is the base circle. From the TDC to 90°, the lift of the cam increases, and the lift becomes maximum (ε MAX) at 90°, so that the head block 6 is positioned at the lowermost position. The head block remains there until the bottom dead center (BDC), because the lift is the same. As the lift decreases from the BDC to the next TDC through the point of 360°, the head block 6 rises. Between the TDC and 450°, the lift increases and becomes maximum (ε max) at 450°. Accordingly, the head block 6 lowers and is located at the lowermost position at 450°. The lift decreases between 450° and the next BDC, and hence the head block rises. Between the BDC and 720° (0°), the cam has the base circle, so that the head block does not move. The contour from the TDC to 90° is designed such that the lift of the cam (the stroke of the head block 6) is equal to the piston travel from the top dead center (length L in FIG. 2). Thus, the motoring pressure is kept maximum from TDC to 90° in crank angle.

On the other hand, cams 2 and 4 are shaped in accordance with the contour of the cam 3 so as to operate the intake and exhaust valves 10 and 11 at proper timings, respectively.

The operation of the resent invention will be explained hereinafter. In the range between 0° and the TDC, the piston 7 is in a final period of the compression stroke, and the head block 6 does not move, and the volume of the combustion chamber 28 has a smallest value at the TDC. From the TDC, the piston 6 lowers together with the head block until 90°. On the other hand, ignition timing is set at such a point that combustion pressure becomes maximum at 90°. Because the displacement stroke of the head block 6 is equal to the piston travel of the piston 7, the volume of the combustion chamber 28 is kept constant, and the motoring pressure in the chamber is maintained maximum between TDC and 90°. Thus, constant volume combustion can be performed. The combustion in the combustion chamber finishes at about 90°. Accordingly, the pressure of the piston 7 against the inside wall 5a of the cylinder block 5 is very small, because the axis of the connecting rod 32 is the tangent to the circle 29b (FIG. 2).

The lift of the head-lifting cam 3 is even between 90° and the BDC, the head block 6 does not move, and only the piston 7 descends, increasing the volume of the combustion chamber. At the BDC, the exhaust valve 11 opens to discharge the exhaust gas in the combustion chamber 28 through the exhaust ports 24a and 24. While the angle θ changes from the BDC to 360° and further to the TDC, the lift is reduced, thus, the head block 6 rises in the cylinder 5. The lift is designed to increase from the TDC to 450° and to be maximum at about 450°, so that the head block 6 descends again in the cylinder. Immediately before 450°, the intake valve 10 opens, and at the angle θ of 450°, the exhaust valve 11 closes. Thus, air-fuel mixture starts flowing into the combustion chamber 28 through the intake ports 23 and 23a. The lift decreases again at the angle θ between 450° and BDC, the head block 6 again starts rising and the piston 7, descending, increasing the volume of the combustion chamber 28. As the crank angle θ changes from the BDC to 720° (0°), the head block 6 does not move because the contour of the head-lifting cam 3 is in the base circle. When the crank angle θ becomes about 630°, the intake valve 10 closes and the compression stroke starts.

As explained above, because the axis 30 of the crankshaft 29 is offset from the axis 31 of the cylinder 5a by the radius of the crank, the pressure of the piston against the cylinder can be reduced. Further, since the head-lifting cam 3 is provided to move the head block 6 to provide the maximum motoring pressure in the cylinder 5a until the crank angle θ changes from TDC to 90 degrees, and the volume of the combustion chamber 28 is constant, constant volume combustion can be performed, thereby reducing the combustion period and improving the combustion efficiency.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A reciprocating internal combustion engine having a cylinder block, a piston slidably mounted so as to travel in a cylinder bore formed in the cylinder block, a crankshaft operatively connected to the piston by a connecting rod defining a crank radius, and intake and exhaust valves, comprising:
    a head block axially slidably mounted in the cylinder bore, forming a combustion chamber between a bottom of the head block and a top of the piston;
    means for moving the head block in the bore in a stroke in accordance with position of the piston the head block moving differently than the piston during cyclic operation of the piston;
    the crankshaft being laterally offset from the axis of the cylinder bore by the crank radius;
    said means being so arranged that the stroke of the head block entirely from TDC to 90° in crank angle of the crankshaft is equal to and in a direction same as that of the piston travel so that said combustion chamber has a constant volume from TDC to 90° in crank angle of the crankshaft.

2. The reciprocating internal combustion engine according to claim 1 wherein
    the intake and exhaust valves are disposed in the head block.

3. The reciprocating internal combustion engine according to claim 1 wherein
    said means comprises a cam rotated at half speed relative to the crankshaft, and spring means for biasing the head block toward the cam.

4. The reciprocating internal combustion engine according to claim 1, further comprising
    means for igniting a fuel-air mixture in said combustion chamber such that combustion pressure in the combustion chamber becomes maximum at 90° crank angle of the crankshaft.

5. The reciprocating internal combustion engine according to claim 1, wherein
    said connecting rod is perpendicular to the crank radius at 90° crank angle of the crankshaft.

6. The reciprocating internal combustion engine according to claim 4, wherein
    said connecting rod is perpendicular to the crank radius at 90° crank angle of the crankshaft.

* * * * *